United States Patent
Borlinghaus

(10) Patent No.: US 6,572,914 B1
(45) Date of Patent: *Jun. 3, 2003

(54) BEVERAGE SUPPLY SYSTEM

(75) Inventor: Axel Horst Borlinghaus, Bechtolsheim (DE)

(73) Assignee: The Procter & Gamble Co., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 646 days.

(21) Appl. No.: 08/817,277

(22) PCT Filed: Sep. 29, 1995

(86) PCT No.: PCT/US95/12491

§ 371 (c)(1),
(2), (4) Date: Apr. 10, 1997

(87) PCT Pub. No.: WO96/11875

PCT Pub. Date: Apr. 25, 1996

(30) Foreign Application Priority Data

Oct. 10, 1994 (EP) ............................................. 94115933

(51) Int. Cl.⁷ ............................. A23L 2/00; A23L 2/08; A23L 2/395
(52) U.S. Cl. ........................ 426/590; 426/599; 426/601; 426/602; 426/650; 426/651

(58) Field of Search .................................. 426/590, 599, 426/602, 650, 651, 601

(56) References Cited

U.S. PATENT DOCUMENTS

| 2,005,786 | A | | 6/1935 | Higby et al. | |
|---|---|---|---|---|---|
| 4,084,012 | A | | 4/1978 | Krumel et al. | ............... 426/590 |
| 4,374,155 | A | | 2/1983 | Igoe et al. | .................. 426/569 |
| 4,830,870 | A | * | 5/1989 | Davis, Jr. et al. | ........... 426/590 |
| 4,919,963 | A | | 4/1990 | Heckert | ...................... 426/599 |

OTHER PUBLICATIONS

Ashurst et al. Food Flavorings, Blackie Academic & Professional, NY, p. 106, 113, 114, 178, 179, 175, 1995.*
Secondini, Handbook of Perfumes & Flavors, Chemical Publishing Co., Inc., N.Y, p 17–20, 74–76, 1990.*
Desrosier, N. Elements of Food Technology, AVI Publishing Co., Inc. CN, p. 667, 668, 1977.*

* cited by examiner

*Primary Examiner*—Helen Pratt
(74) *Attorney, Agent, or Firm*—S. Robert Chuey; Kelly L. McDow-Dunham; Carl J. Roof

(57) ABSTRACT

The present invention relates to beverage supply systems for beverages comprising a flavor composition which comprises an oil phase and an aqueous phase. The flavor composition is concentrated such that it can separate into aqueous and oil phase under usual transport conditions and is provided in a unitized quantity corresponding to a batch supply for dilution to the desired beverage or an integer fraction of such a single batch supply.

7 Claims, No Drawings

BEVERAGE SUPPLY SYSTEM

FIELD OF THE INVENTION

The present invention relates to beverage supply systems for beverages comprising a flavour composition which comprises an oil phase and an aqueous phase. The flavour composition is concentrated such that it can separate into aqueous and oil phase under usual transport conditions and is provided in a unitised quantity corresponding to a batch supply for dilution to the desired beverage or an integer fraction of such a single batch supply.

BACKGROUND OF THE INVENTION

Beverages in particular those which comprise certain amount of fruit juice typically are provided and shipped in bulk quantity as flavour compositions and are diluted in time and space proximity to the place of consumption. The flavour compositions used are typically such as to allow a 12 times to 60 times dilution with water to prepare the desired beverage. Concentration levels above this are not feasible since oil phase and aqueous phase which are typically comprised in the flavour composition of beverages separate. If aqueous and oil phase compounds separate in the flavour composition it becomes necessary to homogenise the composition prior to metering for dilution. This again is due to the bulk shipment quantities of more than a single batch quantity of flavour compositions.

It hence is an objective of the present invention to provide a supply system which allows concentrations beyond those at which the aqueous phase and oil phase remain homogeneous.

It is another objective of the present invention to make obsolete any special homogenisation of the concentrated flavour composition prior to dilution. Also any special metering equipment or unduly complicated method other than the normal dilution process is undesirable.

SUMMARY OF THE INVENTION

The present invention relates to a beverage supply system comprising a transportable flavour composition which comprises at least one aqueous phase compound and one oil phase compound which separate noticeably under usual storage conditions standing at 20° C. within 2-hours. According to the supply system the flavour composition is transported to a local dilution station where a locally available dilution composition is provided. The dilution composition comprises water and can further comprise a sweetener source preferable sugar and/or a fruit juice in concentrate or dilute form. The fruit juice (concentrate or not) can be for example a bulk product lacking some or all of the flavour compounds which are included in the flavour composition.

The flavour composition for the beverage supply system is provided in a unitised quantity corresponding to a single batch mixture of beverage which is to be produced at the local dilution station. The unitised quantity can also be an integer fraction of the a single batch mixture quantity.

The flavour composition preferably comprises already a fruit juice flavour concentrate, vitamins, minerals, colorants and edible acids in ratios desired for the final beverage to be supplied.

Concentration of the flavour composition according to the present invention can be as high as allowing a dilution with 200 or more or even 300 or more parts of the dilution composition per part of the flavour composition. The quantity in which the unitised flavour composition is typically supplied is in the range of 5 to 300 liters preferably 10 to 250 liters and most preferably 20 or 200 liters depending on flavour composition concentration and other factors in the supply system.

DETAILED DESCRIPTION OF THE INVENTION

Definitions

As used herein the term "beverage" refers to a beverage composition which is in a single-strength, ready-to-serve, drinkable form. Beverages of the present invention can comprise at least 50% (preferably at least 80%) added water to dilute a bulk fruit juice concentrate and flavour composition. Beverages contemplated within the scope of the present invention include both carbonated and noncarbonated forms.

As used herein the term "single strength" refers to the recommended beverage strength, i.e. the ready-to-serve concentration of beverage compounds.

As used herein the term "fruit juice" refers to citrus juices, noncitrus juices such as apple juice, grape juice, pear juice, cherry juice, berry juice, pineapple juice, kiwi juice, cashew juice, peach juice, apricot juice, plum juice, prune juice, mango juice, passion fruit juice, banana juice, and mixtures of these juices.

As used herein, the term "citrus juice" refers to fruit juices selected from orange juice, lemon juice, lime juice, grapefruit juice, tangerine juice and mixtures thereof. All amounts of fruit juices referred to herein are on the basis of 100% fruit juice in its single strength concentration.

As used herein percentages are given as percent by weight of the beverage in its single strength dilution. Percentages of water include the amount of water inherent in the beverage unless noted otherwise.

Optionally the beverages according to the present invention can comprise edible acids which include phosphoric acid, fumaric acid, adipic acid, lactic acid, tartaric acid, gluconic acid, succinic acid, malic acid, citric acid or their respective sour salts. Also optionally the beverages according to the present invention can comprise supplemented solubilized minerals which include iron, calcium, magnesium, potassium, sodium, as well as supplemented vitamins.

Beverages of the present invention comprise a flavour composition which comprises a flavour selected from fruit flavours, botanical flavours and mixtures thereof. As used herein, the term "fruit flavour" refers to those flavour derived from the reproductive part of a seed plant, especially one having a sweet pulp associated with the seed. Also included but less preferred within the term "fruit flavour" are synthetically prepared flavours made to simulate fruit flavours derived from natural sources. Particularly preferred fruit flavours are the citrus flavours including orange flavours, lemon flavours, a variety of other fruit flavours can be used such as apple flavours, grape flavours, cherry flavours, pineapple flavours and the like. These fruit flavours can be derived from natural sources such as fruit juices and flavour oils, or else synthetically prepared.

As used herein, the term "botanical flavour" refers to flavours derived from parts of a plant or other than the fruit. As such, botanical flavours can include those flavours from nuts, bark, roots and leaves, including tea leaves. Also included within the term "botanical flavour" are synthetically prepared flavours made to simulate botanical flavours derived from natural sources. Examples of such flavours include cola flavours, tea flavours and the like. These botanical flavours can be derived from natural sources such as essential oils and extracts, or else can be synthetically prepared.

The flavour component can comprise a blend of various flavours e.g. lemon and lime flavours, cola flavours with citrus flavours to form cola flavours etc. If desired, fruit juices or their concentrates such as orange juice, lemon juice, lime juice, apple juice, grape juice and the like can be used in the flavour composition.

The flavour in the flavour composition is sometimes formed into emulsion droplets which are then dispersed in the final beverage. Because these droplets usually have a specific gravity less than that of water and would therefore form a separate phase in the final beverage, weighting agents (which can also act as clouding agents) are typically used to keep the emulsion droplets dispersed in the beverage. Examples of such weighting agents are brominated vegetable oils (BVO) and resin esters, in particular the ester gums. See L. F. Green, *Developments in Soft Drinks Technology*. Vol. 1 (Applied Science Publishers Ltd. 1978) pp. 87–93 for a further description of the use of weighting and clouding agents in liquid beverages. Besides weighting agents, emulsifiers and emulsion stabilisers can be used to stabilise the emulsion droplets. Examples of such emulsifiers and emulsion stabilisers include the gums, pectins, celluloses, polysorbates, sorbitan esters and propylene glycol alginates. See L. F. Green, supra at p. 92.

The particular amount of the flavour composition effective for imparting flavour characteristics to the beverage of the present invention can depend upon the flavour(s) selected, the flavour impression desired, and the form of the flavour composition. For flavour compositions which are substantially free of fruit juice (i.e. on a single strength basis comprising no more than about 1% fruit juice by weight of the beverage) the flavour composition can be comprised in the beverage at an amount of at least 0.01% by weight of the beverage and typically from 0.05% to 1% by weight of the beverage. If fruit juice or concentrates thereof are part of the flavour composition up to twice these amounts can be used.

Beverages provided according to the present invention may also be carbonated. Usually a beverage will be considered to be carbonated if it comprises more than 30%, preferably more than 100% by volume of the beverage of solubilized carbon dioxide. Carbonated beverages comprise typically form 100% to 450%, preferably from 200% to 350% carbondioxide by volume of the beverage.

The carbonated beverage can be placed in a container such as a bottle or a can and then sealed. See L. F. Green, *Developments in Soft Drinks Technology*, Vol. 1 (Applied Science Publishers Ltd. 1978), pp. 102–107, for a further description of beverage making in particular the process for carbonation.

The flavour composition according to the present invention comprises two phases which separate out under typical storage conditions. This separation happens regardless of the amount of flavour composition. However, if the flavour composition amount is too large for using the whole flavour composition for a single batch dilution it must be metered to the required quantity prior to dilution (not according to the present invention). This however, requires a homogenisation of the flavour composition prior to metering or else substantially unequal quality between dilution batches would result.

Therefore, the beverage supply system according to the present invention requires the flavour composition to be provided in unitised quantities which by themselves or as integer multiples of the unitised quantity can be used for batch dilution to provide the beverage.

Dilution Composition

The flavour composition is combined with a dilution composition in order to provide the beverage. The dilution composition provides the bulk quantity of the beverage typically the beverage comprises more than 99% of the dilution composition.

The dilution composition itself comprises essentially water. According to the present invention it should be understood that the dilution composition does not need to be a single liquid. It may for example be provided as a water source, a fruit juice concentrate or puree source, a sweetener source and an additive source which are combined in a batch mixture with the flavour composition when preparing the beverage. The dilution composition may also be itself prepared by combining various compounds or sub compositions such as a fruit juice concentrate or puree source, water, sweetener and other additive compositions. Therefore, when referring hereinafter to the term dilution composition it includes all those compounds found in the beverage which are not part of the flavour composition or in other words the beverage without the flavour composition is the dilution composition.

The beverage supply system according to the present invention is based on the widely availability of dilution compositions at even remote locations while flavour compositions in particular those supplied at high consistency of composition accuracy and quality of ingredients are typically not easily available and have to be transported to the place of mixing the dilution composition with the flavour composition.

Next to water the key compounds in the dilution composition are the fruit juice compounds or its concentrate or puree and the sweetener compounds. Depending on the quantity desired for the final single strength beverage the fruit juice concentrate or puree, water and sweetener composition, are combined prior to combination with the flavouring composition or simultaneous therewith. Beverage additives can be the mineral additives or vitamin additives mentioned above. The fruit juice composition usually will be capable of providing a full fruit juice with the exception of certain desirable flavour compounds. Typically bulk fruit juice concentrate is separated from some of its flavour compounds when concentrating the raw fruit juice. The separated flavour compounds are typically supplied as part of the flavour composition.

The fruit juice concentrate in the dilution composition will provide a certain sweetener effect due to its sugar content. This can be supplemented by additional sugar and/or other sweeteners. Other sweeteners are in particular those nonnutritive sweeteners which can be either natural or synthetic and usually have a much greater sweetness intensity than sugar but without its caloric value. Examples of such non-nutritive sweeteners are saccharin, cyclamate and ASPARTAME also known as NUTRA-SWEET as well as other non-caloric sweeteners known in the art.

The sweetener composition provides together with the sweeteners already present in the flavour composition a maximum amount of solubilized sugar in the single strength beverage of 14%, preferably a maximum 12% by weight. It is, however, more typical to have substantially lower amounts of sugar and supplement the sweetness by the abovementioned non-nutritive sweeteners to provide sweetness comparable to about 5%–15% by weight of sugar.

In the following example a beverage supply system for making an orange flavoured juice drink comprising 10% by weight juice on a single strength basis is described. The flavour composition is prepared to a concentration factor allowing a dilution with 250 times its weight.

EXAMPLE

Flavour Composition

The flavour composition consists of orange aroma citronova, REDD DIST OIL, REDD AROMA, TETRAROME, ASPARTAME, ACESULFAME K, lemon concentrate, and demineralised water. The ingredients can be obtained from any usual source but have been obtained in this case from the Firmenich Company, Geneva, Switzerland (with the exception of demineralised water, lemon concentrate and the sweeteners ASPARTAME and ACESULFAME K which are generally available to the public).

This flavour composition is packed into 20 kilo containers and shipped to the reconstitution plant for mixing and filling of the final beverage. The flavour composition separates into an oil phase and an aqueous phase within less than 2 hours after being packed standing at 20° C.

A locally available dilution composition consist of two sub compositions, one being demineralised water in a quantity of 4177.35 kg, the other being an orange juice concenrtrate composition comprising 400 kg demineralised water, 2.25 kg ascorbic acid, 21.795 kg lemon concentrate, 112.605 kg citrus pulp and 266 kilo orange juice concentrate.

The demineralised water together with the orange juice concentrate composition and one 20 kilo batch of the flavour composition are poured into a agitated premix tank of 5000 liter. They are then pumped through a single homogenisation system typical in the art and pasteurised at ultra high temperature before being placed in a sterile tank. From the sterile tank the finished beverage composition is distributed to a filling station for final packaging of the beverage.

This process saves the complexity involved in providing the flavour composition from a bulk storage where constant homogenisation would be necessary.

What is claimed is:

1. A method of preparing a beverage comprising the steps of:

(a) providing a transportable, non-homogenized flavor composition, said flavor composition comprising at least one aqueous phase compound and at least one oil phase compound, wherein said flavor composition is provided in a unitized quantity corresponding to an integer part of a single batch mixture of the beverage, said integer being greater than 0; and wherein said flavor composition is concentrated such that said aqueous phase compound and said oil phase compound separate noticeably at 20° C. within 2 hours when exposed only to gravitational forces;

(b) providing a locally available dilution composition, said dilution composition comprising water; and (c) mixing said flavor composition with 200 or more parts of said dilution composition per part of said flavor composition, without prior homogenizing and without prior metering of said flavor composition to provide a single batch mixture of the beverage.

2. The method of claim 1 wherein said integer is one.

3. The method of claim 2 wherein the flavor composition comprises an ingredient selected from the group consisting of fruit juice concentrate, fruit juice puree, vitamins, colorants, and minerals.

4. The method of claim 1 wherein said unitized quantity is in the range of 5 liters to 300 liters.

5. The method of claim 4 wherein said flavor composition is such as to allow preparation of said beverage by dilution with 300 or more, parts of the dilution composition per part of the flavor composition.

6. The method of claim 5 wherein said unitized quantity is in the range of 10 liters to 250 liters.

7. The method of claim 6 wherein said unitized quantity is in the range of 20 liters to 200 liters.

* * * * *